(12) United States Patent
Hatfield et al.

(10) Patent No.: US 6,948,259 B1
(45) Date of Patent: Sep. 27, 2005

(54) MASTER STEERING CHECK FIXTURE

(75) Inventors: Bryan Hatfield, Gahanna, OH (US); Douglas P. Decker, Plain City, OH (US); Marc D. Iman, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/770,263

(22) Filed: Feb. 2, 2004

(51) Int. Cl.[7] .............................................. G01D 21/00
(52) U.S. Cl. ............................. 33/645; 33/600; 33/613
(58) Field of Search ........................ 33/645, 1 N, 1 PT, 33/1 CC, 600, 613

(56) References Cited

U.S. PATENT DOCUMENTS

| | | | |
|---|---|---|---|
| 2,316,188 A | | 4/1943 | Rose |
| 3,465,577 A | * | 9/1969 | Donovan ...................... 73/116 |
| 3,813,932 A | * | 6/1974 | Wallace ...................... 73/118.1 |
| 3,889,527 A | | 6/1975 | Wallace |
| 4,393,694 A | * | 7/1983 | Marten et al. ................. 73/117 |
| 4,422,242 A | | 12/1983 | Stocker |
| 4,721,008 A | * | 1/1988 | Stoops et al. .................. 74/552 |
| 4,893,413 A | | 1/1990 | Merrill et al. |
| 5,105,546 A | * | 4/1992 | Weise et al. .............. 33/203.12 |
| 5,544,522 A | | 8/1996 | Little |
| 5,855,072 A | | 1/1999 | Nakaho |
| 6,076,269 A | | 6/2000 | Sekino et al. |
| 6,158,132 A | | 12/2000 | Kofink et al. |
| 6,305,217 B1 | * | 10/2001 | Mansfeld et al. .......... 73/117.2 |
| 6,519,865 B1 | | 2/2003 | Yelverton |
| 2002/0112360 A1 | * | 8/2002 | Brumbaugh ................. 33/613 |

* cited by examiner

*Primary Examiner*—G. Bradley Bennett
*Assistant Examiner*—Tania Courson
(74) *Attorney, Agent, or Firm*—Rankin, Hill, Porter & Clark LLP; Vincent Ciamacco

(57) ABSTRACT

A fixture and method for checking whether a steering column alignment mark is properly placed. The fixture includes a wheel member that is affixed to a spline adaptor and that carries a range marker. The range marker has a length that corresponds with an acceptable deviation. The fixture is rotatably linked to the steering column, and then the steering column, by manipulation of the vesture, is rotated the maximum amount in one direction, and then the position of the range marker is compared to a fixed reference. Based upon this comparison, it is determined whether the alignment mark is properly positioned on the steering column.

22 Claims, 3 Drawing Sheets

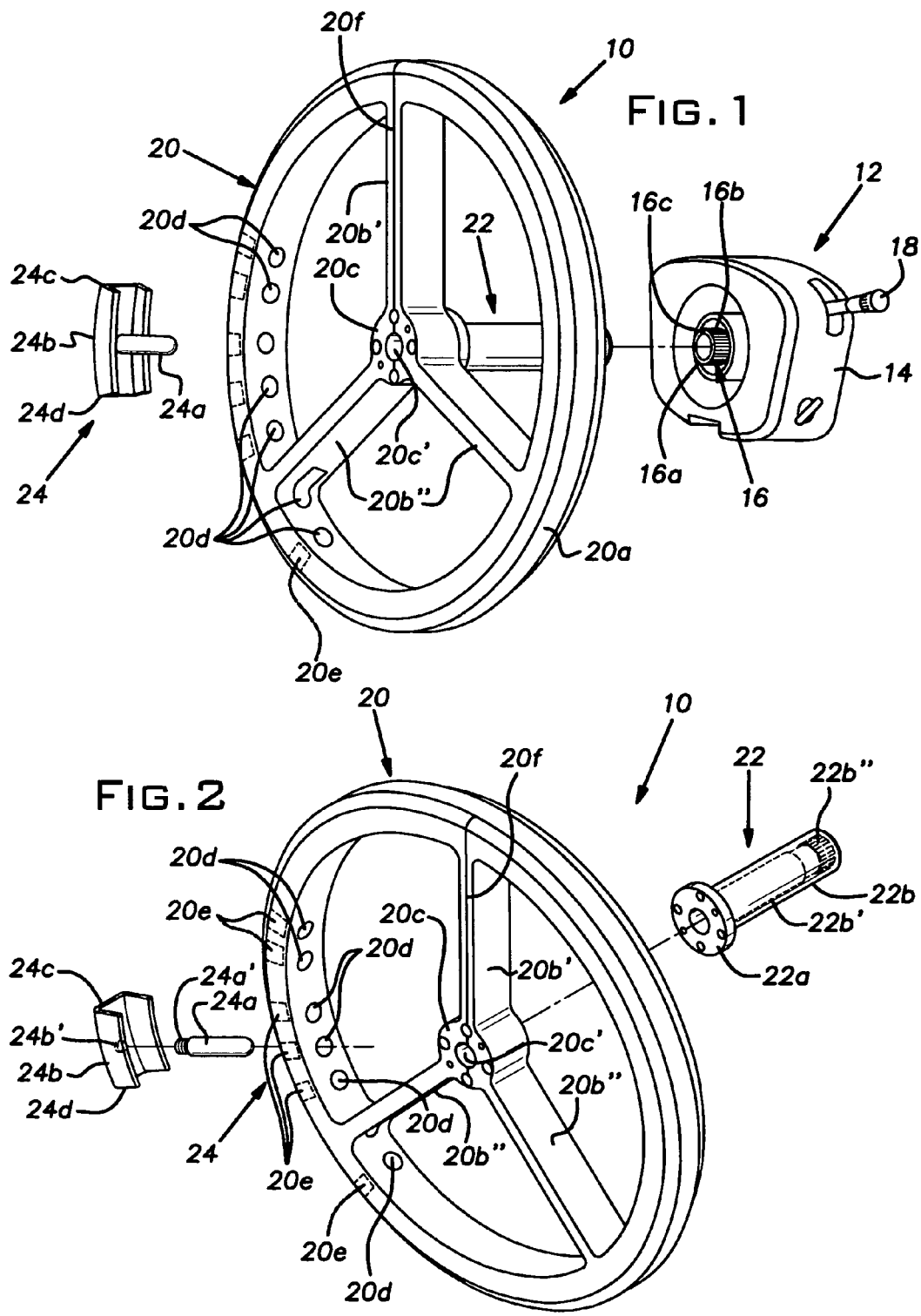

MASTER STEERING CHECK FIXTURE

BACKGROUND OF THE INVENTION

1. Field of the Invention

The present invention is generally directed toward vehicle steering alignment and, more particularly, toward a fixture for checking a steering column alignment mark, which is subsequently used for properly orienting a steering wheel on the steering column.

2. Description of Related Art

In manufacturing automobiles, it is known to use an apparatus to mark the steering column to permit proper orientation of the steering wheel relative to the steering column. The steering column mark is placed in a location on the steering column corresponding to a neutral or centered position of the steering column. This method of marking the steering column and aligning the steering wheel with the steering column works well under normal circumstances.

However, it sometimes occurs that the apparatus used to mark the steering column is not operating correctly. In this situation, the mark is improperly positioned on the steering column, and this ultimately leads to a steering wheel that is misaligned relative to the steering column. A misaligned steering wheel will appear to be turned left or right when the steering column is neutral or centered (i.e., steering the vehicle "straight ahead"). Such misalignment must be corrected, preferably before the vehicle has left the factory, or else the driver will not feel comfortable with the steering performance.

Further complicating this problem is the fact that the error in the steering column mark placement may not be detected until much later in the assembly process, at which point numerous vehicles having potentially improper steering wheel alignments have been produced. Therefore, in addition to having to examine the steering column marking apparatus to determine and correct the problem that resulted in the improper placement of the alignment mark on the steering column, the steering wheel alignment on numerous vehicles must be checked and corrected, if necessary. Naturally, this is a time consuming process that creates significant expense and downtime for the manufacturer.

Therefore, there exists a need in the art for an apparatus and method for checking the accuracy of the steering column marking machine and, more particularly, checking whether the steering column alignment mark is, in fact, in the correct position on the steering column. Moreover, there exists a need in the art for such an apparatus and method that may be used in connection with several different vehicle models.

SUMMARY OF THE INVENTION

The present invention is directed toward an apparatus and method for checking the performance and accuracy of a steering column marking device and, more particularly, toward an apparatus and method for checking the position of a steering column alignment mark so as to ensure proper orientation of the subsequently installed steering wheel.

In accordance with the present invention, a steering check fixture includes a wheel member and a range marker. The wheel member is adapted to be rotatably secured to a steering column and defines a plurality of mounting locations into which the range marker may be selectively installed. Each of the mounting locations corresponds to a particular vehicle model.

In further accordance with the present invention, the wheel member includes an annular outer portion, a central hub, and a series of arms extending between the outer portion and the hub. The range marker is secured to the outer portion of the wheel member. One of the arms and the hub include a reference mark to facilitate orientation of the fixture relative to the alignment mark.

The fixture also includes a spline adaptor that extends from the central hub and is adapted to be rotatably secured to the steering column. The spline adaptor fits over the steering column so as to leave the steering column alignment mark on the steering column exposed. The fixture reference mark is aligned with the steering column alignment mark to properly orient the fixture relative to the steering column during placement of the fixture on the steering column.

The range marker includes a body portion and a mounting pin. The mounting pin extends through the hole in the wheel member outer portion corresponding to the particular vehicle model whose steering column alignment mark position is being verified. The body portion is disposed on the wheel member outer portion, and has a predetermined length that corresponds to an acceptable deviation of the steering column alignment mark from a centered location.

In accordance with a method for checking whether a steering column alignment mark is properly positioned, the range marker is installed in the hole (mounting location) corresponding to the host vehicle model, and the fixture is placed over the steering column at a predetermined orientation (i.e., with the reference mark aligned with the alignment mark), and secured to the steering column for mutual or common rotation. Thereafter, the fixture and steering column are rotated in one direction the maximum amount. After rotation, the position of an indicator on the fixture is compared to a fixed reference and, based upon this comparison, it is determined whether the alignment mark is properly placed on the steering column.

BRIEF DESCRIPTION OF THE DRAWINGS

These and further features of the present invention will be apparent with reference to the following description and drawings, wherein:

FIG. 1 is an exploded perspective view of a steering column and a master steering check fixture according to the present invention;

FIG. 2 is an exploded perspective view of the master steering check fixture illustrated in FIG. 1;

DETAILED DESCRIPTION OF THE PREFERRED EMBODIMENTS

Figure 3A:
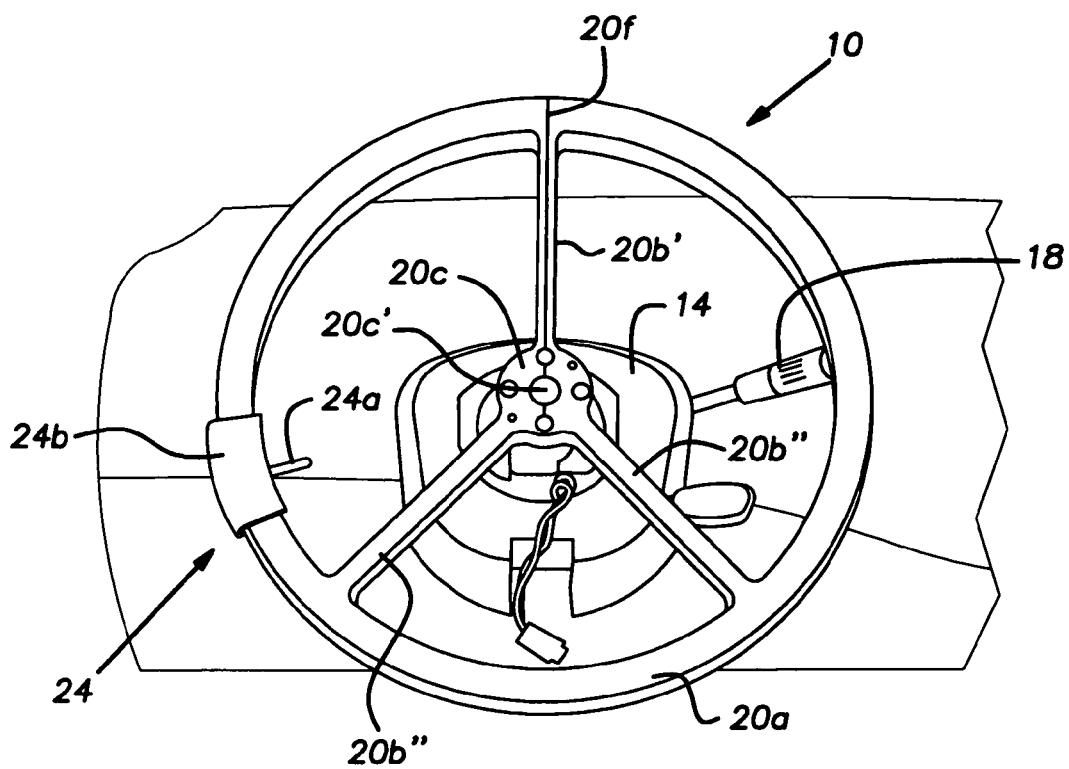
FIG. 3A is a view of the master steering check fixture disposed on the steering column in an initial position.

With reference to FIG. 1, the master steering check fixture 10 of the present invention is shown adjacent a steering column assembly 12 prior to installation thereon. The steering column assembly 12 includes a steering column housing 14, a steering column 16 disposed within the steering column housing 14, and a wiper actuator arm 18 that extends at an angle from the steering column housing 14. The wiper arm 18 serves as a fixed reference against which rotation of the steering column is checked, as will be apparent from the following discussion.

An exposed upper end of the steering column 16 includes an annular upper rim 16a and an exposed peripheral or circumferential surface. A series of lengthwise extending teeth or splines 16b are formed on the peripheral surface of the steering column 16, as illustrated. The steering column teeth 16b mesh with corresponding splines provided by the steering wheel (not shown) and thereby rotatably link the steering wheel to the steering column 16, as is well known in the art.

The steering column annular upper rim 16a has a steering alignment mark 16c stamped or marked thereon by a steering column alignment and marking apparatus (not shown). The alignment mark 16c serves as a reference point by means of which the steering wheel is properly positioned on the steering column 16. More specifically, assuming that the alignment mark 16c is placed in the proper position, by aligning the steering wheel with the steering column alignment mark 16c it will be assured that the steering wheel is substantially straight (i.e., not turned appreciably to the right or left) when the vehicle is being driven straight ahead.

To that end, the master steering check fixture 10 of the present invention is adapted to be placed over the steering column 16, and thereafter manipulated in accordance with the method of the present invention to check whether the steering column alignment mark 16c is, in fact, in the desired position (i.e., a position in which the subsequently installed steering wheel will be 'straight' when the vehicle is driven straight ahead). As will be apparent from the following discussion, the master steering check fixture 10 of the present invention is designed for use with multiple vehicles, thereby simplifying on-line checking of the steering alignment mark 16c in production environments.

With reference to FIG. 2, the mastering steering check fixture 10 includes a wheel member 20, a spline adaptor 22, and a range marker 24. The wheel member 20, which is preferably formed or machined from a solid disk of aluminum, includes a generally annular or ring-shaped outer portion 20a that is connected by a series of spoke-like arms 20b', 20b" to a central hub 20c. In the illustrated and preferred embodiment the arms include a pair of lateral arms 20b" and a center arm 20b'. Naturally, more or less than the illustrated three arms may be used without departing from the scope and spirit of the present invention.

The through holes 20d are provided at predetermined positions along the wheel member outer portion 20a. Each of the holes 20d serves as a possible mounting location for the range marker 24. The holes 20d extend radially, that is horizontally, through the wheel member outer portion 20a so as to extend through the inner and outer surfaces thereof, as illustrated. The holes 20d are adapted to receive the range marker 24, with the particular hole 20d that the range marker is inserted into corresponding to the host vehicle.

More specifically, the maximum rotation of the steering wheel on a vehicle from a centered position (i.e., FIGS. 3A–3B) to a stop position (i.e., FIGS. 4A–4C) depends upon the steering gear box of the vehicle. The gear box being used will depend upon at least the engine and transmission being used in that particular vehicle model. For example, a two-door four cylinder vehicle may have a gear box with a first maximum steering wheel rotation wherein a two-door six cylinder vehicle may have a gear box with a second, relatively smaller maximum steering wheel rotation. Therefore, the fixture of the present invention is adapted to have the range marker 24 installed in the precise hole 20d corresponding to the vehicle model whose alignment mark position is being checked.

To that end, the upper surface of the wheel member outer portion 20a will ordinarily have indicia, such as a label 20e (shown in phantom), adjacent to each of the holes 20d. Each of the labels 20e preferably includes vehicle information and will clearly indicate to the user the appropriate hole 20d to place the range marker 24 into (i.e., the range marker position corresponding to the vehicle for which the steering alignment mark 16c is to be checked).

The central hub 20c is generally circular, and defines a central opening 20c' and a series of mounting holes, as illustrated. The arms 20b', 20b" are integrally attached, at equally spaced intervals, to the peripheral surface of the central hub 20c. Although it is preferred that the central hub 20c and arms 20b', 20b" are integrally formed, it is contemplated that they can be separately formed and thereafter attached to one another, such as by welding or equivalent bonding techniques, or by mechanical fasteners.

In the illustrated and preferred embodiment, a reference line 20f extends along the length of the center arm 20b', across the upper surface of the central hub 20c, and on an inner or annular surface of the central hub defining the central opening 20c', as illustrated. The reference line 20f is preferably engraved along the centerline of the center arm 20b' and hub 20c. Although desirable, provision of the reference line 20f on the inner or annular surface of the central hub may be considered optional. Further, in an alternative, although less preferred embodiment, the reference line 20f is engraved only on the upper and inner surfaces of the central hub. In a still less preferred embodiment, the reference line 20f is engraved only on the hub inner or annular surface defining the central opening 20c'.

The hub central opening 20c' permits the user to look through the hub 20c to properly orient or align the fixture 10 during placement thereof on the steering column 16. Moreover, the essentially continuous reference line 20f provided along the central arm 20b' and hub 20c permits the user to quickly and precisely visually align and orient the master steering check fixture 10 relative to the steering column 16 (i.e., the steering column alignment mark 16c) during placement of the master steering check fixture 10 on the steering column 16, described hereinafter.

The spline adaptor 22 includes a flange portion 22a and a downwardly extending shaft 22b. The flange portion 22a is sized and adapted so as to be affixed to the lower surface of the wheel member central hub 20c and, to that end, includes a series of mounting holes that match those provided in the central hub 20c. The aligned mounting holes on the hub 20c and flange portion 22a are adapted to receive mounting bolts or pins or a combination of bolts/pins. Although the spline adaptor flange portion 22a is preferably pinned and bolted to the central hub 20c, it is contemplated that the central hub 20c could be formed to integrally include the spline adaptor 22, if desired. It is further contemplated that the spline adaptor 22 could be welded to the central hub 20c if the spline adaptor 22 and central hub 20c were made of the same material.

The spline adaptor shaft 22b is generally hollow so as to define an elongated central passageway 22b' that communicates with the hub central opening 20c'. Cooperation of the hub central opening 16c and the spline adaptor central passageway 22b' permits the user to look down through the fixture 10 to see the steering column 16, which facilitates alignment of the fixture reference line 20f with the steering column alignment mark 16c.

An inner surface at the lower end of the spline adaptor shaft 22b' has a series of longitudinally oriented or extending splines or teeth formed therein, which are hereinafter referred to as fixture splines 22b". The fixture splines 22b" are essentially equivalent or identical to the splines that are formed on the steering wheel and, in use, the fixture splines 22b" align and mesh with corresponding teeth 16b provided on the steering column 16, described hereinbefore. Accordingly, when the fixture splines 22b" mate or mesh with the steering column teeth, the master steering check fixture 10 is rotatably linked to the steering column 16.

The range marker 24 includes a mounting pin 24a and a body portion 24b. The body portion 24b is generally U-shaped in cross section, having a side surface, an upper surface, and a lower surface that are each somewhat arc-shaped so as to have a curvature that matches that of the wheel member outer portion 20a over which the range marker body portion 24b is mounted. Therefore, the range marker body portion 24b, when installed on the wheel member 20, covers a part of the outer, upper, and lower surfaces of the wheel member outer portion 20a, as illustrated. Preferably, the spacing between the upper and lower surfaces of the body portion 24b is equal to, or just slightly larger than, the distance between the corresponding surfaces of the wheel member outer portion 20a so that the body portion 24b is received on the wheel member outer portion in a sliding or friction-type fit. Alternatively, distal ends of the upper and lower surfaces of the body portion 24b may include projections (not shown) that extend toward one another such that the body portion 24b may be resiliently snapped over the wheel member outer portion 20a so as to assist in releasably retaining the range marker 24 on the wheel member outer portion 20a.

A threaded hole 24b' is formed in the center (i.e., midpoint) of the side surface of the range marker body portion 24b to permit threaded attachment of the mounting pin 24a. The mounting pin 24a helps to secure the range marker body portion 24b to the wheel member outer portion 20a and to assist in the inventive method of determining whether the alignment mark 16c is centered, as described hereinafter. Preferably, the mounting pin 24a has an outer diameter that is equal to, or just slightly smaller than, the diameter of the through holes 20d formed in the wheel member outer portion 20a such that the mounting pin 24a is closely received in the through holes 20d. By employing a friction-type fit between the mounting pin 24a and the wheel member outer portion 20a, the range marker 24 can be easily secured to the wheel member 20.

It has been determined that an acceptable position of the alignment mark 16c is one in which the steering column 16 is either centered, or within one tooth of a centered position in a clockwise or counterclockwise direction. Accordingly, a length of the range marker body portion 24b is selected such that, assuming that the center (midpoint) of the range marker 24 corresponds with an exactly centered alignment mark 16c, a first end 24c of the range marker body portion 24b will generally correspond to a circumferential distance one tooth or spline offcenter in the clockwise direction, while a second or opposite end 24d of the range marker body portion 24b will generally correspond to a circumferential distance one tooth or spline offcenter in the counterclockwise direction.

The mounting pin 24a is elongated and has a threaded proximal end 24a'. The mounting pin 24a has a length such that, when the range marker 24 is secured to the wheel outer portion 20a, the threaded proximal end 24a' is threadably received in the hole 24b' of the range marker body portion 24b while the pin 24a extends or projects through the hole 20d formed in the wheel member outer portion 20a, as shown in FIG. 3. Frictional interaction between the pin 24a and the hole 20d (together with the length of the pin 24a relative to the hole 20d), and frictional interaction between the body portion 24b and the wheel member outer portion 20a reliably secure the range marker 24 to the wheel member 20. Moreover, in this arrangement the range marker 24 may be secured to, and removed from, the wheel member 20 without any tools, which greatly facilitates repositioning of the range marker 24.

Naturally, it is contemplated that the range marker mounting pin 24a and body portion 24b may be secured to one another and to the fixture wheel member 20 in other ways, such as is used in known quick-disconnect fittings, bayonet-type attachment, and quarter-turn type attachment methods. It is further contemplated that the mounting pin 24a could be omitted and that the body portion 24b could be affixed to the wheel member 20 using other releasable mechanical fastening techniques.

Hereinafter, a method of using the master steering check fixture 10 to check the position of the steering column alignment mark 16c will be described.

Initially, with the range marker 24 assembled by threading the mounting pin 24a into the body portion 24b, the range marker 24 is a preliminary secured to the wheel portion 20a by inserting the mounting pin 24a through the hole 20d in the fixture body outer portion 20a that corresponds to the vehicle model on which the steering column alignment mark 16c is being checked, and pushing the marker body portion 24b over the wheel member outer portion 20a. As noted above, the close fitting of the pin 24a in the hole 20d, together with the close fitting of the body portion 24b over the wheel member outer portion 20a serves to conveniently retain the range marker 24 on the wheel member 20 without any additional fasteners and without use of assembly tools.

It is noted that, in conventional vehicle manufacture, many dozen identical vehicles are sequentially manufactured before a model change. Therefore, the range marker 24 can be positioned on the wheel member 20 and then left alone for many subsequent alignment mark checking procedures.

Naturally, the frequency of checking the accuracy of the steering column alignment mark 16c could be varied. For example, the alignment mark accuracy may be checked with each model change, or with each shift change, or at some other predetermined interval. Further, if a problem in the alignment mark accuracy is encountered, the mark accuracy will ordinarily be checked more frequently (i.e., on every vehicle) until some confidence in the accuracy of the mark placement is restored.

Figure 3B:
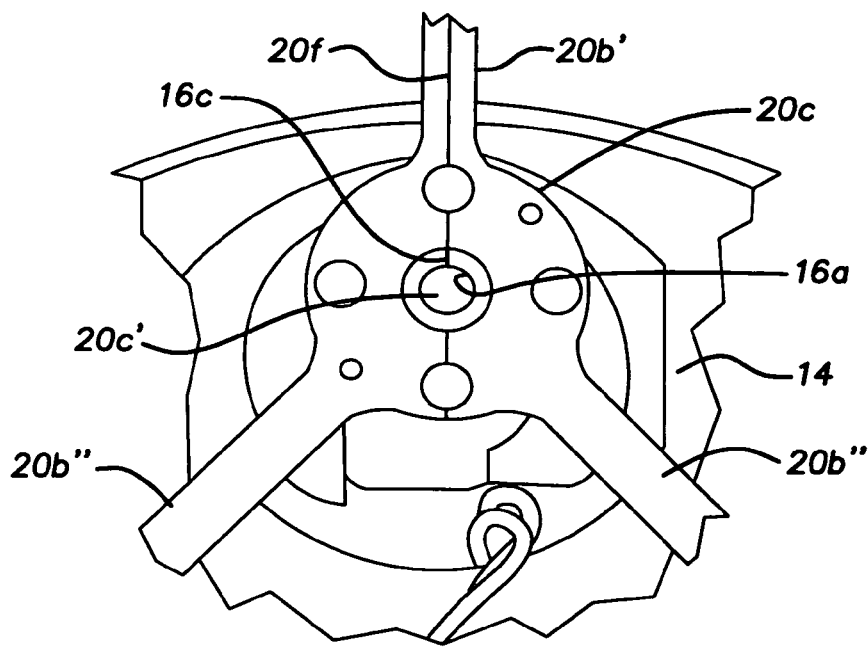
FIG. 3B is an enlarged plan view of the mastering steering check fixture disposed on the steering column, illustrating the alignment marks on the steering check fixture and the steering column.

Thereafter, the fixture 10, assembled as described hereinbefore, is aligned with the steering column 16 and placed on the steering column 16, as shown in FIG. 3A, such that the fixture splines 22b" mesh with the steering column teeth 16b and such that the reference line 20f and the alignment mark 16c are aligned with one another, as shown in FIG. 3B. Accordingly, the fixture 10 is placed over the steering column 16 at a predetermined orientation relative to the steering column alignment mark 16c. In this regard, alignment between the reference line 20f and the alignment mark 16c is meant to indicate that the alignment mark 16c essentially forms a continuation of the reference line 20f, as illustrated. In this initial position, the fixture 10 is rotatably linked with the steering column 16.

Figure 4A:
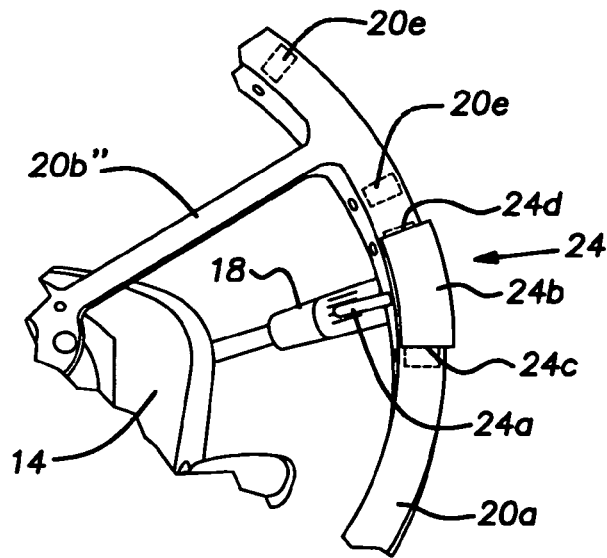
FIG. 4A is an enlarged view of the master steering check fixture after turning thereof, illustrating the range marker in an aligned position relative to the wiper arm.

Thereafter, the fixture 10 is rotated counterclockwise the maximum amount (i.e., until a steering column rotational stop is encountered), and then the position of the range marker 24 relative to the wiper actuator arm 18 is checked. When the range marker pin 24a is aligned with the base of the wiper actuator arm 18 such that the range marker pin 24a points to the base of the wiper actuator arm 18, as shown in FIG. 4A, then it is determined that the alignment mark 16c is perfectly centered on the steering column 16. Alternatively, if the range marker pin 24a is displaced in the counterclockwise direction from the wiper actuator arm 18 while a projection of the wiper actuator arm 18 still intersects the range marker body 24b (i.e., the projection of the wiper arm 18 is essentially aligned with the first end 24c of the marker body), as shown in solid lines in FIG. 4B, then it is determined that the alignment mark 16c is one tooth offcenter in the clockwise direction. Similarly, if the range marker pin 24a is displaced in the clockwise direction from the wiper actuator arm 18 while a projection of the wiper actuator arm 18 still intersects the range marker body i.e., the projection of the wiper arm 18 is essentially aligned with the second end 24d of the marker body), as shown in solid lines in FIG. 4C, then it is determined that the alignment mark 16c is one tooth offcenter in the counterclockwise direction. As noted previously, each of the aforementioned positions is acceptable and, therefore, the alignment mark 16c is properly placed. Accordingly, the range marker 24 serves as an indicator to readily show whether the alignment mark 16c is placed in the proper location on the steering column 16. In any event, with the mark 16c being determined to be within one tooth of center, the alignment mark checking procedure for this vehicle is concluded and the vehicle is passed for further assembly.

Figure 4B:
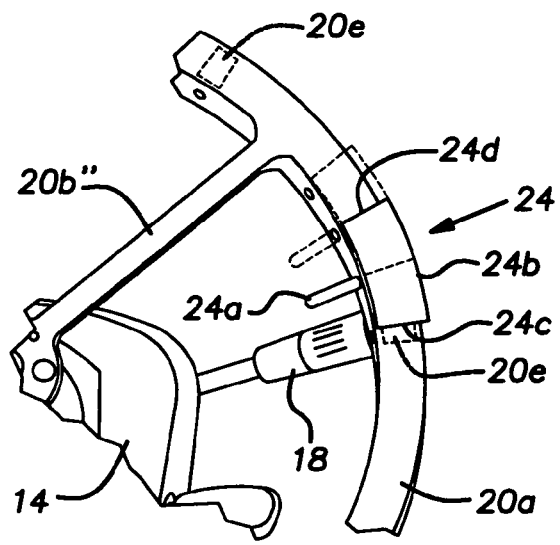
FIG. 4B is an enlarged view of the master steering check fixture after turning thereof, illustrating the range marker is, in solid lines, shown in an acceptable position one 'tooth' out of alignment and, in phantom, in an unacceptable position two 'teeth' out of alignment.
Figure 4C:
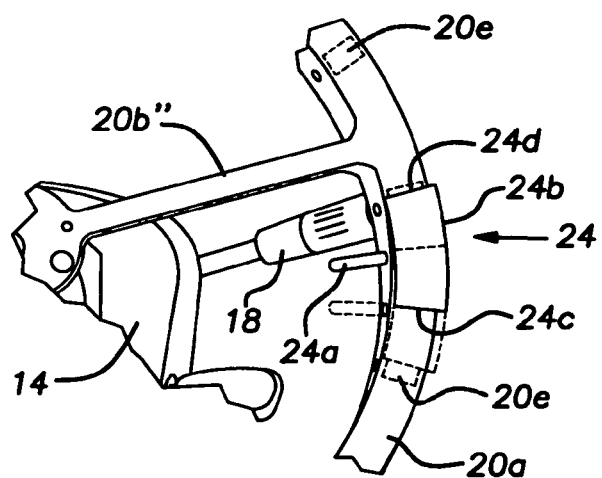
FIG. 4C is an enlarged view of the master steering check fixture, similar to FIG. 4B, wherein the range marker is, in solid lines, shown in an acceptable position one 'tooth' out of alignment and, in phantom, in an unacceptable position two 'teeth' out of alignment.

However, if following counterclockwise rotation of the fixture 10 the maximum amount, the range marker pin 24a is displaced in the counterclockwise direction from the wiper actuator arm 18 so much that the projection of the wiper actuator arm 18 does not intersect the range marker body portion 24b, as shown in dashed lines in FIGS. 4B and 4C, then it is determined that the alignment mark 16c is more than one tooth offcenter. The drawing of FIG. 4B illustrates in dashed lines the situation in which the alignment mark 16c is two teeth offcenter in the clockwise direction. Similarly, the drawing of FIG. 4C illustrates in dashed lines the situation in which the alignment mark 16c is two teeth offcenter in the counterclockwise direction. In either of these cases, the position of the alignment mark 16c is unacceptable, and remedial measures are necessary. The remedial measures include examining the steering column marking apparatus to find the cause of the incorrect mark placement, and correcting the alignment mark position on the subject car's steering column 16.

Accordingly, the present invention readily permits checking of the steering column alignment mark 16c so as to insure that the subsequently installed steering wheel is centered.

What is claimed is:

1. A steering check fixture for use in checking whether an alignment mark on a steering column is properly placed, comprising:
   a wheel member that is adapted to be rotatably secured to the steering column, said wheel member defining a plurality of mounting locations, each of said plurality of mounting locations corresponding to a particular vehicle model;
   a range marker secured to the wheel member at one of said plurality of mounting locations whereby comparison of a position of said range marker relative to a fixed reference after rotating the fixture a predetermined amount is determinative of whether the alignment mark has been properly placed on the steering column.

2. The fixture according to claim 1, wherein said wheel member includes an annular outer portion, a central hub, and a series of arms extending between said outer portion and the hub, said range marker being secured to said outer portion of said wheel member.

3. The fixture according to claim 2, further comprising a spline adaptor that extends from said central hub and is adapted to be rotatably secured to the steering column.

4. The fixture according to claim 2, wherein said range marker includes a body portion that is disposed on said wheel member outer portion.

5. The fixture according to claim 4, wherein said body portion has a predetermined length corresponding to an acceptable deviation.

6. The fixture according to claim 5, further comprising a spline adaptor that extends from said central hub and is adapted to be rotatably secured to the steering column.

7. The fixture according to claim 4, wherein said range marker includes a mounting pin that secures said body portion to said wheel member outer portion.

8. The fixture according to claim 1, wherein each of said plurality of mounting locations are defined by separate holes in said wheel member, said range marker including a body portion and a separate mounting pin, wherein said mounting pin extends through one of said holes and secures said body portion to said wheel member.

9. The fixture according to claim 8, further comprising indicia on said wheel member and associated with each of said holes, said indicia including information that permits an appropriate hole of said plurality of holes to be selected.

10. The fixture according to claim 9, wherein said indicia is provided on a label affixed to the wheel member.

11. The fixture according to claim 1, wherein said wheel member includes an annular outer portion, a central hub, and a series of arms extending between said outer portion and the hub, said range marker being secured to said outer portion of said wheel member.

12. The fixture according to claim 11, further comprising a spline adaptor that extends from said central hub and is adapted to be rotatably secured to the steering column.

13. The fixture according to claim 12, wherein said range marker includes a body portion that is disposed on said wheel member outer portion and said body portion has a predetermined length corresponding to an acceptable deviation.

14. The fixture according to claim 1, wherein said fixed reference is a wiper arm that extends at an angle form the steering column.

15. A method for checking whether an alignment mark, used for subsequent positioning of a steering wheel, on a steering column is properly placed, comprising the steps of:
- positioning a fixture over said steering column at a predetermined orientation relative to the alignment mark and such that said fixture is rotatably linked to said steering column;
- rotating said fixture in one direction a predetermined amount;
- comparing a position of an indicator on said fixture with a fixed reference and determining, based upon said comparison, whether said alignment mark is properly placed; and,
- removing said fixture from said steering column.

16. The method according to claim 15, wherein said fixture includes a series of mounting locations for said indicator, each of said mounting locations corresponding to a particular model vehicle, comprising the further step of:
- determining a model of a vehicle in which the steering column alignment mark is to be checked; and,
- mounting said indicator to the mounting location corresponding to the determined model of vehicle.

17. The method of claim 15, wherein said predetermined amount of rotation depends upon a model of a vehicle in which the steering column alignment mark is to be checked, and corresponds to a rotation from a start position to an end position, said end position being a limit of steering column rotation.

18. The method of claim 16, wherein said predetermined amount of rotation depends upon a model of a vehicle in which the steering column alignment mark is to be checked, and corresponds to a rotation from a start position to an end position, said end position being a limit of steering column rotation.

19. The method according to claim 15, wherein said fixture includes a reference line, and wherein said positioning step includes the step of aligning said reference line with said alignment mark.

20. The method according to claim 19, wherein said fixture includes a series of mounting locations for said indicator, each of said mounting locations corresponding to a particular model vehicle, comprising the further step of:
- determining a model of a vehicle in which the steering column alignment mark is to be checked; and,
- mounting said indicator to the mounting location corresponding to the determined model of vehicle.

21. The method of claim 20, wherein said predetermined amount of rotation depends upon a model of a vehicle in which the steering column alignment mark is to be checked, and corresponds to a rotation from a start position to an end position, said end position being a limit of steering column rotation.

22. The method of claim 19, wherein said predetermined amount of rotation depends upon a model of a vehicle in which the steering column alignment mark is to be checked, and corresponds to a rotation from a start position to an end position, said end position being a limit of steering column rotation.

* * * * *

UNITED STATES PATENT AND TRADEMARK OFFICE
CERTIFICATE OF CORRECTION

| | |
|---|---|
| PATENT NO. | : 6,948,259 B2 |
| APPLICATION NO. | : 10/770263 |
| DATED | : September 27, 2005 |
| INVENTOR(S) | : Hatfield et al. |

It is certified that error appears in the above-identified patent and that said Letters Patent is hereby corrected as shown below:

On the Title Page, Item [75], Line 2, delete "Plain City", and insert --Hilliard--.

On the Title Page, Item [75], Line 3, delete "Hilliard", and insert --Plain City--.

Signed and Sealed this

Twenty-ninth Day of August, 2006

JON W. DUDAS
*Director of the United States Patent and Trademark Office*